Oct. 7, 1958    J. S. HOWELL    2,854,844
DEVICE FOR CALIBRATING HEAT RESPONSIVE UNITS
Filed May 19, 1954    3 Sheets-Sheet 1
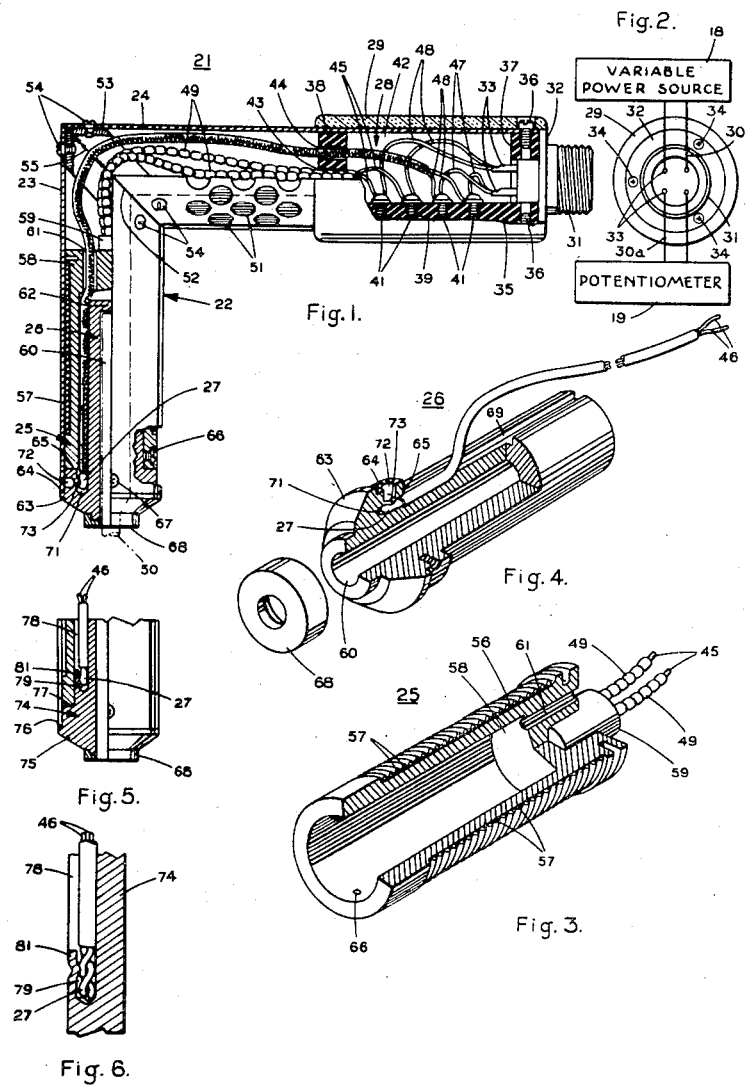
INVENTOR
John S. Howell
BY Cushman, Darby & Cushman
ATTORNEYS Oct. 7, 1958  J. S. HOWELL  2,854,844
DEVICE FOR CALIBRATING HEAT RESPONSIVE UNITS
Filed May 19, 1954  3 Sheets-Sheet 2
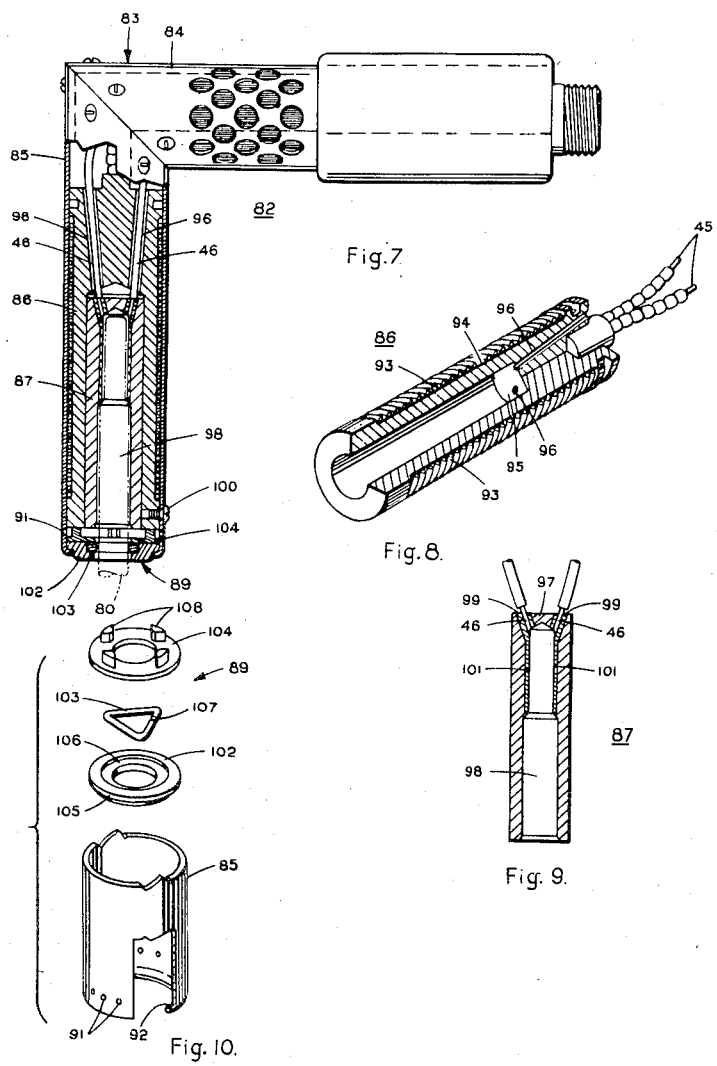
INVENTOR
John S. Howell
BY Cushman, Darby & Cushman
ATTORNEYS Oct. 7, 1958  J. S. HOWELL  2,854,844
DEVICE FOR CALIBRATING HEAT RESPONSIVE UNITS
Filed May 19, 1954  3 Sheets-Sheet 3

INVENTOR
John S. Howell
BY Cushman, Darby & Cushman
ATTORNEYS

United States Patent Office 2,854,844
Patented Oct. 7, 1958

2,854,844

DEVICE FOR CALIBRATING HEAT RESPONSIVE UNITS

John S. Howell, Fort Worth, Tex., assignor to B. & H. Instrument Company, Inc., Fort Worth, Tex., a corporation of Texas Application May 19, 1954, Serial No. 430,857

4 Claims. (Cl. 73—1)

The present invention relates to devices for testing heat condition responsive units and more particularly to devices for testing heat sensing units to determine if such units are operating within specified temperature ranges.

The accuracy of heat sensing or temperature indicating units is of vital importance to the proper functioning and safety of a modern aircraft and its power plant, such units being located in strategic portions of the aircraft to permit a determination that the more important operating temperatures of the aircraft and its component parts are within optimum or permissible limits.

There are two common forms of aircraft heat sensing units, which will be described herein, for which the present invention is particularly adapted although it is to be understood that the invention is not limited in its use to but these two forms. One common form of heat sensing unit employed in aircraft is the thermoswitch or fire detector which embodies a pair of dissimilar metals having different coefficients of thermal expansion. As is well known, the dissimilar metals, on being subjected to heat, tend to expand at different rates to thereby either open or close an electrical circuit after a certain amount of expansion of the metals has occurred. The thermoswitch or fire detector may be readily calibrated to open or close its associated electrical circuit at a specified temperature, or within a certain temperature range, the temperature or temperature range being directly related to a predetermined amount of expansion of the pair of dissimilar metals. In service, a thermoswitch may be mounted on the firewall of an aircraft engine nacelle and connected in the circuit of the fire detection system of the aircraft. If the temperature at which the firewall thermoswitch is calibrated to operate is reached, the thermoswitch actuates its electrical circuit, in this case the fire detection system circuit, and the pilot is alerted by visual or audible means, such as a warning light or buzzer located in the pilot's compartment, that the normal operating temperature has been exceeded in the vicinity of the firewall.

The other common form of aircraft heat sensing unit for which the present invention is particularly adapted is the thermocouple type unit. This unit, like the thermoswitch, may also actuate an electrical circuit at a specified temperature or within a certain temperature range, but ordinarily its function is to continuously sense the actual temperature of that portion of the aircraft in which it is located. A thermocouple heat sensing unit comprising a pair of dissimilar metallic wire, such as a Chromel-Alumel combination, with the ends of one wire being joined to the ends of the other wire to form a pair of junctions. One of these junctions is usually referred to as the "hot" junction, being located at that point where the temperature is to be measured, and the other junction, usually termed the "cold" junction, being located at or wired to the terminals of apparatus for measuring electrical current, such as a millivoltmeter located in the pilot's compartment.

As is well known, the application of heat to the hot junction of the thermocouple heat sensing unit causes an electromotive force to be generated in the thermocouple circuit. This electromotive force can be measured and indicated in electrical units at the cold junction of the thermocouple unit by means of the millivoltmeter, however, since the generated electromotive force is proportional to the temperature differential between the hot and cold junctions of the thermocouple, the millivoltmeter is usually not calibrated to indicate the flow of this electromotive force, but rather is calibrated to indicate directly the temperature of the hot junction in temperature units, such as degrees centigrade or Fahrenheit.

For an illustrative example of a use of the thermocouple type of heat sensing unit, reference is made to an aircraft having jet reaction propulsion units. In aircraft of this type, a fairly precise and continuous determination of the jet cone or tail pipe temperature is required in order that the pilot be apprised of a faulty propulsion unit, and a conventional method commonly employed to determine this temperature utilizes for each jet reaction propulsion unit a plurality, usually four, of the thermocouple type heat sensing units. These thermocouple units are located on the propulsion units approximately equally spaced about the inner periphery of the tail pipes thereof, and are usually connected in parallel circuitry by appropriate wiring, this parallel circuit in turn being connected to the millivoltmeter in the pilot's compartment whereby the resultant reading of the four thermocouple units may be noted by the pilot.

It has been found that heat sensing units such as the thermoswitches and thermocouple units described above frequently tend to lose their accuracy over a period of time and may operate at temperatures other than those temperatures for which they have been designed. For this reason, periodic inspections of the installed units are necessary to locate malfunctioning units. In addition, checks and inspections after installation, that is, environmental inspections, are desirable for the reason that the particular location or position of the installed unit sometimes alters the operating characteristics of the unit to an extent not predictable before installation. The inspection of thermoswitches after installation in the aircraft is desirable for still another reason. For example, it is conventional practice to employ a plurality of these thermoswitches in the aircraft fire detection system, distributing them at those critical locations where fire would usually occur. Each thermoswitch is calibrated to operate at the temperature determined to be dangerous for its particular location. The various thermoswitches used in the aircraft's fire detection system are normally supplied by one manufacturer, and although the thermoswitches may be calibrated to operate at different temperatures, there is usually close similarity in the size and configuration of the various thermoswitches. Thus there may be a bank of thermoswitches designed for operation at 750° C., another bank designed to operate at 400° C., and still another bank designed to operate at 200° C. These several similar appearing thermoswitches are usually connected in a parallel electrical circuit to a single indicator, such as a warning light in the pilot's compartment.

In the event that an erroneous installation is made of a 200° C. thermoswitch where a 750° C. thermoswitch is required, due to the similarity in appearance of the various thermoswitches or for some other reason, normal operation of the aircraft would very likely activate the fire detection system, indicating that safe operating temperatures had been exceeded, when in fact, a hazardous condition did not exist. Likewise, it is apparent that if a high temperature thermoswitch is used in a location calling for a lower temperature switch the warning to the pilot may be delayed. Since these several differently calibrated thermoswitches are usually mounted in a parallel circuit, heretofore there was no satisfactory way to determine which thermoswitch was improperly installed without removing and checking each one individually.

Additionally, it has been found that a thermoswitch is sometimes improperly calibrated by a manufacturer, or stamped with an incorrect identifying part number, thereby resulting in a situation analogous to that described in connection with the installation of an inappropriate thermoswitch. Therefore, inspection after installation is very desirable.

Similar problems are encountered in checking and inspecting the thermocouple type of heat sensing unit, and further, where such units are installed in the tail pipe of a jet aircraft, it has been common practice to check the thermocouple units by actually starting the jet engine and duplicating its flight operation. In this manner the thermocouple units are heated sufficiently to enable an approximate check of their operation after installation but this procedure is unsatisfactory for various reasons, such as that it requires the consumption of large quantities of fuel, and further additional personnel are needed to operate the jet engine while the checking of the thermocople units is in progress.

Removing and checking each thermocouple unit for inspection using conventional laboratory equipment also is not satisfactory since this method does not provide an environmental check of the thermocouple unit nor a check of the circuit in which the unit is installed, but rather provides only a check of the unit under more or less ideal laboratory conditions.

Another method used in the prior art for checking thermoswitches and thermocouple units, subsequent to their installation in the aircraft, involved the application of heat to the particular heat sensing unit with a soldering iron or blowtorch. This method was ineffective to determine whether the units were functioning properly and at best only indicated whether the units were operative or completely inoperative.

It is, therefore, apparent that a testing device, preferably portable, is needed which will conveniently and speedily determine whether or not a heat sensing unit, or a plurality of such units, as for example, thermoswitches and thermocouple units, are functioning properly after such units have been installed in an aircraft. In addition, the testing device desirable should include a temperature measuring system, such as a thermocouple arrangement adapted for sensing with comparatively high accuracy the temperature of the heat sensing unit being tested whereby the temperature as sensed by the testing device may be compared with the temperature sensed by the heat sensing unit, in the case of a thermocouple unit, or the temperature at which the heat sensing unit actuates other apparatus, in the case of a thermoswitch.

It is, therefore, a primary object of the present invention to provide a novel device for substantially accurately determining whether or not a heat sensing unit is functioning properly.

It is another object of the invention to provide a portable device of unique construction for quickly and simply checking the accuracy of heat sensing units after they have been installed in an aircraft circuit or the like.

It is still another object of the invention to provide an improved thermocouple system adapted for sensing and measuring temperature with a comparatively high degree of accuracy.

It is a further object of the invention to provide a unique device for comparatively easily determining if the proper heat sensing unit has been installed in a circuit.

It is another object of the invention to provide a testing device which may be adapted for testing either a thermoswitch or a thermocouple unit for proper operation.

Other objects and features of the present invention will be readily apparent to those skilled in the art from the following specification and appended drawings, wherein is illustrated various forms of the invention, and in which:

Figure 1 is a side view, partially in section, of one embodiment of a testing device according to the present invention;

Figure 2 is a view of the right end of the testing device of Figure 1;

Figure 3 is a perspective view, partially cut away, of the heating member according to the invention;

Figure 4 is a perspective view, partially cut away, of the heat conductor according to the invention, illustrating in particular the thermocouple arrangement;

Figure 5 is a detail sectional view of a different thermocouple arrangement;

Figure 6 is an enlarged detail sectional view of the thermocouple arrangement of Figure 4;

Figure 7 is a side view, partially in section, of a second embodiment of a testing device according to the present invention.

Figure 8 is a perspective view, partially cut away, of the heating member utilized in the embodiment illustrated in Figure 7;

Figure 9 is a sectional view of the heat conductor utilized in the embodiment illustrated in Figure 7;

Figure 10 is an exploded perspective view mainly illustrating the nose assembly utilized in the embodiment illustrated in Figure 7;

Figure 11:
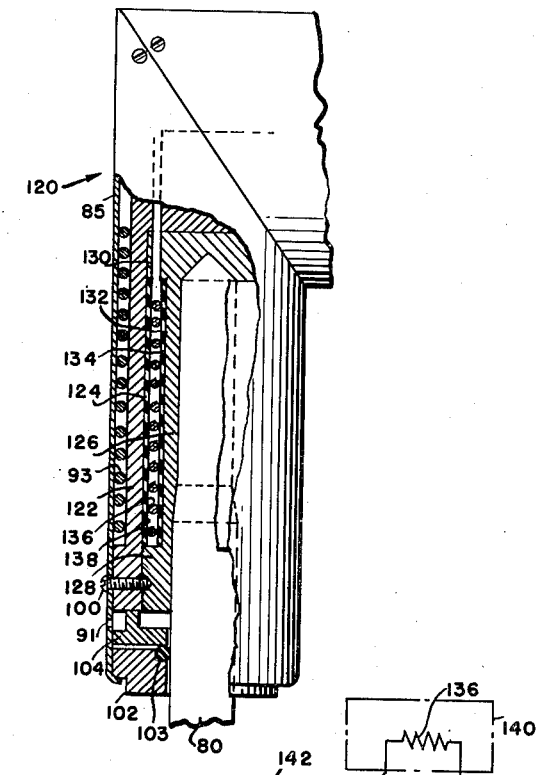
Figure 11 is a side view, partly in section, of a third embodiment of a testing device according to the present invention.

The testing device according to the present invention is adapted to convert power from a suitable power source into heat, and apply such heat in a measured degree to a heat sensing unit. The power supplied is variable and controlled by a conventional auto-transformer, in the case of alternating current, or by a conventional regulator, in the case of direct current, whereby a variable and controlled heat may be applied to the heat sensing unit by the testing device. Ordinarily a heat sensing unit, such as a thermoswitch or a thermocouple unit, is somewhat elongated and cylindrical in shape, and protrudes from the surface of the structure to which it is mounted. The testing device is, therefore, adapted to fit over and enclose the cylindrical main body of the unit whereby the unit may be heated by radiation and conduction from the testing device. It is to be understood, of course, that the testing device of the present invention is capable of adaptation to various sizes and shapes of heat sensing units, as will be seen.

A heating unit or element in the testing device serves to convert the power input from the variable power source into heat which is transferred to the heat sensing unit being tested by a heat conductive member or heat conductor associated with the heating element, the heat conductor substantially uniformly distributing the heat throughout that portion of the heat sensing unit which is in contact with the testing device.

The temperature of the heat sensing unit being tested is to be substantially accurately sensed by a temperature sensing device, such as a thermocouple, which is embodied in the testing device or an element the resistance of which varies with temperature, in combination with an externally located conventional potentiometer or other temperature indicating or measuring device, which desirably includes a direct reading dial calibrated in degrees of temperature on an appropriate scale, such as Fahrenheit or centigrade.

A novel thermocouple arrangement also forms a part of the present invention, being adapted to measure temperature with a comparatively high degree of accuracy, as will be described in greater detail hereinafter.

It will thus be apparent that the temperature indicated by the thermocouple arrangement of the present invention may be readily compared with the indications and operation of heat sensing units being tested whereby a check can be had on the operability and accuracy of such units.

For ease of explanation, the description hereinafter made will be concerned with embodiments of the present invention which are particularly adapted by their construction for the testing of thermoswitch and thermocouple heat sensing units, respectively, which are located in an airplane vehicle employing a jet reaction propulsion unit. Although the invention is described with particular reference to such heat sensing units, it is to be understood that the features of the invention also make it adaptable to modification for use in connection with other installations, including similar heat sensing units associated with different types of vehicles and with vehicles employing propulsion units other than jet reaction propulsion units, as, for example, internal combustion engines.

One embodiment of the present invention, hereinafter sometimes referred to as the "thermoswitch tester," is particularly directed to the testing of the thermoswitch type of heat sensing unit which may be located, for example, in the fire detection circuit of an aircraft.

Referring now to Figures 1 through 6, and in particular Figures 1 and 2, a thermoswitch tester 21 having a construction in accordance with the present invention is illustrated. Preferably, thermoswitch tester 21 assumes generally a right angle configuration to thereby more easily reach thermoswitches located in comparatively inaccessible areas.

Tester 21 comprises a tubular enclosure or housing 22 which is divided into a section 23 and a section 24 disposed generally at right angles to one another, housing section 23 serving to contain a heating element 25, a heat conductive element 26 and a temperature sensing device or thermocouple 27 and housing section 24 enclosing a junction assembly 28. A handle 29, fabricated of a suitable heat insulating material, is disposed about housing section 24 radially outwardly of assembly 28 for protecting the hands of the user of tester 21 from excessive heat.

Junction assembly 28, encased in housing section 24, serves to orient, arrange, and insulate a portion of the internal wiring (to be hereinafter described in detail) of tester 21. In addition, assembly 28 includes a threaded electrical fitting or connector 31 which is carried at the right end, as viewed in Figure 1, of tester 21 and is adapted to have suitably electrically connected thereto the lead-in ends of wiring 30 which interconnects tester 21 and a variable power source 18 and the lead-in ends of wiring 30a which interconnects tester 21 and a temperature measuring device, such as a conventional potentiometer 19.

Connector 31 embodies an integral circular flange portion 32 which fits within the right end of housing section 24 to thereby close the open end of section 24. Additionally, connector 31 is provided with four pin contacts 33 which are inwardly disposed with respect to tester 21 and serve as terminals for the connections between the internal wires of tester 21 and external wiring 30 and 30a. Connector 31 is rigidly secured in position by three screws 34, which are disposed through flange portion 32 and threaded into an end of an insulating or terminal block 35 contained within housing section 24, block 35, itself, in turn being held within the right-hand end of housing section 24 by a pair of screws 36 or the like disposed through handle 29 and housing section 24, and threaded into terminal block 35.

Terminal block 35, which is made of suitable electrical insulation material, includes right and left end portions 37 and 38, respectively, which fit snugly within housing section 24, and an interconnecting middle portion 39 integral with these end portions 37 and 38. Mid portion 39 of block 35 is adapted to mount four terminal screws 41, while right end portion 37 carries the screws 34 and 36, above-described, which serve to secure connector 31 and block 35 in position relative to housing section 24. Left end portion 38 of block 35 serves to form an electrically and, to a degree, a thermally insulating wall across housing section 24 to thereby define between end portions 37 and 38 in an insulated chamber 42 adapted to contain the connections between the internal wiring of tester 21 and the lead-in wires to tester 21, as will be described. In addition, left end portion 38 is provided with openings 43 and 44 through which are disposed a pair of heater wires 45, for connection to heating member 25 in housing section 23, and a pair of thermocouple wires 46 for connection to thermocouple 27 also in housing section 23.

As illustrated, the pair of thermocouple wires 46 are carried through opening 44 in the form of a single cable for convenience in the wiring of tester 21, wires 46 being appropriately insulated from each other in the cable by conventional insulation shielding. Thermocouple wires 46 are each connected to a separate terminal screw 41, preferably the two right-hand screws 41 carried by mid-portion 39 of insulating block 35. A pair of thermocouple terminal wires 47 are connected between these same terminal screws 41 and two of pin contacts 33 provided by connector 31, preferably the lower two, as seen in Figures 1 and 2, whereby thermocouple wires 46 are electrically connected to the lead-in wiring 30a which is connected to potentiometer 19.

In a connecting arrangement similar to that described for thermocouple wires 46, heater wires 45 which pass through opening 43 of left end portion 38 are connected to the remaining two terminal screws 41 on insulating block 35 and a pair of heater terminal wires 48 are connected between such terminal screws 41 and the remaining two pin contacts 33 to thereby provide an electrically continuous connection between heater wires 45 and the lead-in wiring 30 which is connected to variable power source 18. The length of heater wires 45 located exteriorly of insulating block 35 between opening 43 and the connection to heating member 25 are preferably insulated by porcelain beading 49 whereby wires 45 are substantially protected from the effects of high temperatures.

The connections just described of wires 45 and 46 and terminal wires 47 and 48 to terminal screws 41 and pin contacts 33 may be suitably accomplished by any conventional method, such as by soldering, for example.

Housing 22 is preferably fabricated of a thin walled, non-corrosive material, such as stainless steel, whereby housing 22 is characterized by corrosion resistance and improved heat dissipation properties. To further the dissipation of heat, housing section 24 is provided with a plurality of peripherally disposed apertures 51.

The division of housing 22 into the two tubular housing sections 23 and 24 to form the preferred right angle configuration illustrated facilitates assembly and disassembly of tester 21, as will be apparent. Sections 23 and 24 are joined at the juncture of their mating ends at 52 and secured together by a tubular fitting 53 together with a plurality of screws 54. Fitting 53 is conveniently fabricated by welding together, as at 55, two annular sections of tubing cut on a bias from tubing stock having an outer diameter such that the tubing sections may fit snugly within the mating ends of housing sections 23 and 24 upon assembly of tester 21. Screws 54 are disposed through the tubular walls of housing sections 23 and 24 and threaded into fitting 53 to thereby rigidly secure the two sections 23 and 24 of housing 22 together. Clearly this method of attaching sections 23 and 24 to one another permits convenient disassembly when desired merely by the removal of screws 54.

Heating member 25 is cylindrical in shape having a recess extending therewithin from its lower end, as illustrated in Figure 3. As shown in Figure 1, member 25 is positioned within the lower portion of housing section 23 closely adjacent the inner walls thereof, and is fixedly secured in this position by means to be described. Member 25 embodies a reduced diameter section 56 to thereby serve as a conventional core to accommodate windings 57 of suitably insulated high resistance electrical wire, such as Nichrome wire, for heating member 25. In addition, as illustrated in Figure 3, member 25 includes an integral wall 58 which serves to close the upper end of member 25, and also serves to accommodate a fitting 59 through which heater wires 45 are led in and suitably connected to windings 57, as will be understood by those skilled in the art. Also, wall 58 is provided with an opening 61 through which thermocouple wires 46 pass for connection to heat conductor 26, as will be seen.

Heat conductor 26 is adapted to fit snugly within heating member 25, receiving heat therefrom by radiation and conduction. In order to receive and transfer heat, with maximum efficiency, to the heat sensing unit being tested, such as a thermoswitch 50 (indicated in Figure 1 by broken lines), heat conductor 26 should possess good heat conductive properties, and for this reason is preferably made of copper having a high degree of purity. However, any other material or alloy having a sufficiently high melting point to withstand the heat developed in the testing operation, and possessing good thermal conductivity or heat transfer characteristics, may be employed for this purpose.

As best illustrated in Figures 1 and 4, heat conductor 26 comprises a hollow cylinder, having a bore 60 closed at its upper end, as viewed in Figure 1, by a wall 62 which, in the assembled tester 21, is located in spaced relation with wall 58 of heating member 25. Bore 60 is provided in heat conductor 26 for receiving the thermoswitch 50 to be tested. The shape of bore 60, of course, will be dictated by the configuration of the particular thermoswitches to be tested. The lower end of conductor 26 embodies an integral and outwardly depending circumferential flange 63 whose upper portion fits within the lower end of housing section 23 adjacent the inner walls thereof. Conductor 26 is properly located within housing section 23 by a portion 64 of flange 63, which abuts the circumferential lower edge of housing section 23, and by an upper face 65 of flange 63, which is disposed in abutment with the circumferential lower end of heating member 25.

Heating member 25 is secured to heat conductor 26 by a set screw 66 which is threadably disposed through member 25 flush with the outer surface thereof, set screw 66 being adapted to engage the outer surface of conductor 26 in the conventional manner, such securement being most conveniently accomplished prior to assembly of tester 21. In addition, heat conductor 26 is rigidly secured to housing section 23 by a plurality of screws 67, preferably two, which are desirably disposed flush with the outer surface of housing section 23 and threadably secured to flange 63 of heat conductor 26.

The open end of heat conductor 26 is capped with an annular peripherally flanged guard ring 68 which is press fitted into position. Ring 68 is preferably made of a non-corrosive and relatively hard material, such as stainless steel, to thereby protect the lower end of heat conductor 26 from mutilation during use of tester 21.

Heat conductor 26 also includes a longitudinally extending groove 69 which, in the assembly of heating member 25 and heat conductor 26, lies contiguous with longitudinal opening 61 in wall 58 of heating member 25; conductor 26 further embodies a cavity 71 located in longitudinal alignment with flange 63 and arranged in longitudinal alignment with groove 69. Into cavity 71 there is fitted the end, or hot junction, of a standard bi-metallic thermocouple 27, while the insulated thermocouple wires 46 thereof are nested within longitudinal groove 69 and extended across the space between walls 62 and 58 of members 26 and 25, passed upwardly through opening 61 of wall 58, and thereafter led through housing sections 23 and 24 to junction assembly 28 at the right-hand end of housing section 24.

It is here specifically noted that the end of thermocouple 27 is fixedly secured within cavity 71 in a novel and unique manner. By way of comparison, in the conventional arrangement of a thermocouple, the thermocouple is normally insulated against any metal-to-metal contact, but such an insulated thermocouple has proved to be unsatisfactory at elevated temperatures due to the electrical breakdown of the high temperature insulating material customarily used, as, for example, ceramic material. The breakdown of these materials is such that the materials sometime function substantially as electrical conductors. Additionally, most insulating materials positioned between the thermocouple and the surrounding metal impede the flow of heat to the thermocouple to thereby impair the ability of the thermocouple to measure the actual temperature of the surrounding metal. The undesirable features just described are substantially eliminated in the present invention by locating and affixing thermocouple 27 in intimate metal-to-metal contact with the highly heat conductive heat conductor 26. Such affixing of thermocouple 27 may be accomplished by welding or brazing or the like, but in the preferred thermoswitch tester 21 the thermocouple 27 is staked in position. More specifically, a cavity 72, located in radial alignment with cavity 71, is provided in flange 63 of heat conductor 26, leaving a thin web or partition 73 separating cavities 71 and 72. After proper location of thermocouple 27 in cavity 71, and preferably before assembly of tester 21, a suitable staking tool is driven into cavity 72 to thereby crimp or stake partition 73 inwardly, thus securely retaining thermocouple 27 in position. It will be apparent that with the arrangement described, a temperature measurement of the metal surrounding the thermocouple may be had which is of comparatively high accuracy by virtue of the intimate and uninsulated contact between thermocouple 27 and such surrounding metal. It is understood that such a thermocouple arrangement, as herein described, is also adaptable for association with forms of temperature sensing and measuring devices other than tester 21.

Thermocouple 27 is located in cavity 71 as described, and in this position will effect an indication of temperature by potentiometer 19, the temperature indicated being the temperature in the vicinity of cavity 71. For example, if thermoswitch 50 is designed to actuate a circuit, such as a fire detection circuit, at 500° C., the location of thermocouple 27 must be chosen such that thermocouple 27 will effect a temperature reading of 500° C. when thermoswitch 50 is at 500° C. It will be understood that at this temperature portions of heat conductor 26 and thermoswitch 50 may be at higher or lower temperatures than 500° C., but the average temperature of thermoswitch 50 will be 500° C. when thermocouple 27 effects a 500° C. reading. Thus, for a particular thermoswitch, cavity 71 is the proper location for thermocouple 27 whereby thermocouple 27 will effect a temperature indication approximately equal to the temperature of the thermoswitch.

Appreciable variations in location of thermocouple 27 will result in different temperature readings by potentiometer 19 but the proper location for the attachment of thermocouple 27 may be readily determined by conventional test procedures for each particular size or type of thermoswitch, and also for such variations as are made in the component parts of tester 21. In a low temperature range, as for example, from 0° C. to 200° C., the location of thermocouple 27 is not particularly critical, but in the high temperature range, as, for example, from 200° C. to the upper heat capacity of tester 21, this location becomes more critical, principally for the reason that the temperature gradients are greater at elevated temperatures.

There is illustrated in Figures 5 and 6 a thermocouple arrangement differing from that above-described as to the location of thermocouple 27 within heat conductor 26. Figures 5 and 6 provide an example of a change in construction which may be employed in order to effect a more accurate temperature reading when a thermoswitch of different type or size is to be tested than can be serviced by the first above-described construction. As illustrated, the design of the heat conductor in this modification has been altered only for the purpose of positioning thermocouple 27 in a different location, but other than this the construction and function of the heat conductor, herein Figures 5 and 6 indicated generally by the numeral 74, is unchanged. Thus, heat conductor 74 is adapted, just as is heat conductor 26, to fit within heating member 25, with the upper portion of its flange 75 adapted to fit within housing section 23 to be secured therein in a manner identical with the location and securement of heat conductor 26, as above previously described. That is, a portion 76 of flange 75 is adapted to abut the circumferential lower edge of housing section 23, and an upper face 77 of flange 75 is adapted to abut the circumferential lower end of heating member 25. In addition, annular cap 68 is press fitted over the open end of heat conductor 74 to protect the end thereof, as was done in connection with heat conductor 26.

As illustrated, heat conductor 74 embodies a longitudinally extending groove 78 which terminates in an undercut portion or cavity 79 spaced farther from the end of the heat conductor 74 as compared with the location of the cavity 71 provided in heat conductor 26. The undercut cavity 79 is bridged by a ledge or partition 81 which is of a thinness which permits staking of thermocouple 27 in position within cavity 79 in a manner similar to that previously described in connection with partition 73 and cavity 71 of heat conductor 26.

Figures 5 and 6 are provided merely to illustrate the ease with which a suitable testing device can be effected for thermoswitches of various types or sizes. Thus, simply by changing the location of the cavity into which the end of the thermocouple is staked, a testing device is evolved which will substantially accurately reflect the average temperature of the thermoswitch to be tested. The best location of the cavity for a particular thermoswitch is readily determined by conventional test procedures.

Since thermoswitch 50 is completely encased by heat conductor 26, or heat conductor 74 as the case may be, thermoswitch 50 will assume a substantially identical temperature to that of heat conductor 26. In order to minimize heat losses and to insure a maximum heat transfer from heat conductor 26 to thermoswitch 50, the fit therein should be fairly snug, a preferred tolerance being approximately five to ten thousandths of an inch between the outer diameter of thermoswitch 50 and the inner diameter of heat conductor 26. Since this preferred tolerance is comparatively close, it is apparent that various sizes and shapes of bores for heat conductors 26 are necessarily contemplated by the present invention in order that various sizes and shapes of thermoswitches may be tested. Thus, for example, a bore 60 of desired tolerance which will satisfactorily test a one-half inch diameter thermoswitch cannot serve for a three-eights inch diameter thermoswitch even though bore 60 could readily encase both sizes of thermoswitch.

In operation, tester 21 will have thermoswitch 50 encased within its bore 60, which it is understood is of proper diameter, and variable power source 18 is adjusted to regulate the input power to tester 21. By way of example, assume that the thermoswitch 50 being tested is designated to actuate a fire detection circuit at a temperature of 400° C. with a tolerance of plus or minus 25° C., thus having an operating range of 375° C. to 425° C. The power is adjusted until sufficient heat is generated by member 25 to cause thermocouple 27 to effect a temperature reading of 375° C. by potentiometer 19. The power input is gradually increased, thereby slowly raising the temperature of heating member 25 and hence heat conductor 26 and, in turn, thermoswitch 50, until thermoswitch 50 has actuated the first detection circuit. At this point the temperature indicated by potentiometer 19 is noted and compared with the operating range of thermoswitch 50 whereby a reliable check may be had on the operation and accuracy of thermoswitch 50.

As is apparent, the portable nature of tester 21 enables tester 21 to be carried to various portions of the aircraft as desired. Further, tester 21 is readily adapted for simultaneously testing a plurality of thermoswitches 50 by employing a plurality of testers 21 electrically connected in parallel and associated with such thermoswitches whereby the resultant temperature reading of the plurality of testers 21 may be indicated on the potentiometer and compared with the temperature at which the plurality of thermoswitches 50 have been caused to actuate the circuit in which thermoswitches 50 are employed.

Another embodiment of the present invention, hereinafter sometimes referred to as the "thermocouple tester," is particularly directed to the testing of a thermocouple type of heat sensing unit, generally designated in Figure 7 by the numeral 80, which may be located, for example, in the jet cone or tail pipe of a jet aircraft. As previously described, these thermocouple units are a part of the tail pipe and will be found to be approximately equally spaced about the periphery of the tail pipe, and are usually connected in parallel by appropriate wiring, the resultant reading being exhibited by a millivoltmeter located in the pilot's compartment. For clarity of description, the testing of a single thermocouple unit 80 will be described, rather than the testing of a plurality of interconnected thermocouple units.

Referring now to Figures 7 through 10, and in particular Figure 7, a thermocouple tester 82 is illustrated which, like thermoswitch tester 21, is generally of a right angle configuration to thereby more easily reach thermocouple units 80 located in comparatively inaccessible areas within the tail pipe. This embodiment of the present invention generally comprises a tubular enclosure or housing 83, which is divided into a section 84 and a section 85. Inasmuch as section 84, the components housed therein, the connection between sections 84 and 85, and the connections between tester 82 and the lead-in wiring to variable power source 18 and potentiometer 19 are all substantially identical to that previously described in connection with thermoswitch tester 21, the description hereinafter made will be mainly directed to the other housing section 85 and the components housed therein. Where tester 82 is identical to tester 21, like numerals will be employed to designate like parts.

Section 85 serves to house, generally, a heating member 86, a heat conductor 87, and a nose assembly 89.

Housing section 85, like section 23 of thermoswitch tester 21, is preferably fabricated of a thin-walled, non-corrosive material, such as stainless steel, whereby section 85 is characterized by corrosion resistance and improved heat dissipation properties. To assist in the dissipation of heat, section 85 is provided with a plurality of peripherally disposed apertures 91 at its lower end. In addition, section 85 is provided with an integral, inwardly disposed peripheral shelf or lip 92 at its lower edge to thereby support and retain nose assembly 89, as will be seen.

Heating member 86, as best illustrated in Figure 8, is substantially identical with heating member 25 of tester 21, being cylindrical in shape and positioned within the lower portion of housing section 85, as illustrated in Figures 7 and 8. Member 86 is secured to section 85 by any suitable means, such as by a screw 100 which is threadably disposed through section 85 and member 86. As in tester 21, windings 93 encircle a reduced diameter section 94 of heating member 86; an integral wall 95 serves to close the upper end of member 86; and heater wires 45 are led into member 86 and connected to windings 93. In addition, wall 95 is provided with a pair of openings 96 through each of which a thermocouple wire 46 is disposed for connection to heat conductor 87, as will be further discussed.

Heat conductor 87, which is preferably made of copper, as is heat conductor 26 of tester 21, is adapted to fit snugly within heating member 26, by press or drive fit or the like, flush with the lower end of member 86, and comprises a hollow cylinder closed at its upper end by a wall 97. As illustrated, this construction defines a hollow chamber or bore 98 which is adapted for receiving thermocopule unit 80.

In the construction of heat conductor 87, as best illustrated in Figure 9, thermocouple wires 46 are separately passed through openings 96, each of wires 46 also being disposed through a separate one of a pair of aligned openings provided in wall 97 of conductor 87, as at 99. In addition, a suitable brazing material 101 is afforded within the upper portion of bore 98 and within the openings provided in wall 97 to thereby completely fill such openings and secure wires 46 in position. In this manner, conductor 87 is adapted both to receive a thermocouple unit 80 within the bore 98 and to serve the additional function of a thermocouple possessing the same thermoelectric characteristics as the arrangement of thermocouple 27 with the heat conductor 26, as previously described. In effect, a third member, conductor 87, has been interposed between the ends of wires 46 whereby a new and novel temperature sensing or thermocouple arrangement is produced.

The thermocouple unit 80 for which tester 82 is particularly adapted for use conventionally comprises a cylindrical body portion, the upper or outward end of which carries a thermocouple providing a continuous indication of temperature. Since thermocouple unit 80 fits snugly within cavity 98 of tester 82, and the wires 46 together with conductor 87 function as a thermocouple to effect an indication of the temperature in the upper portion of conductor 87, it will be apparent that this temperature can be compared with the temperature indication effected by the thermocouple of unit 80. Further, since the thermocouples of tester 82 and thermocouple unit 80 are approximately adjacent to each other, the temperature indications effected by each should substantially agree, and comparison of such temperature indications will readily reveal any malfunction or inaccuracy of thermocouple unit 80.

It is to be understood that various bore sizes and shapes of heat conductors 87 are necessarily contemplated by the present invention in order to accommodate various sizes and shapes of thermocouple units, such as was described in connection with conductor 26 of tester 21.

Nose assembly 89, best illustrated in Figure 10, is disposed within the lower end of housing section 85, and is located between lip 92 and the flush lower ends of conductor 87 and heating member 86. Assembly 89 serves to grasp the cylindrical body portion of thermocouple unit 80 to thereby maintain tester 82 in position over thermocouple unit 80. Assembly 89 is described with particular reference to tester 82, but it will be readily apparent that thermoswitch tester 21 may also be adapted to include nose assembly 89.

Assembly 89 comprises an annular nose collar 102, a triangular-shape spring lock 103, and an annular nose spacer 104. Nose collar 102 is preferably made of stainless steel to withstand elevated temperatures and embodies a peripheral flange 105 which rests upon lip 92 of section 85 to thereby retain nose assembly 89 within section 85. In addition, collar 102 is provided with an annular recessed portion 106 within which spring lock 103 is located.

Spring lock 103 is split at 107 and serves as a spring element, being adapted to spread apart at 107 sufficiently to permit thermocouple unit 80 to be forced beyond assembly 89 and into bore 98. The spring action of lock 103 tends to force lock 103 against the contacted periphery of thermocouple unit 80 to thereby normally substantially prevent sliding movement therebetween. Lock 103 is preferably made of a metal or metal alloy characterized by temperature and corrosion resistance, and further characterized by an ability to retain a spring action, as previously described, at such elevated temperatures as may be encountered in the operation of tester 82. A suitable material for lock 103 is a nickel alloy, known to the trade as Inconel "x," manufactured by International Nickel Company, New York, New York.

Nose spacer 104, which abuts the upper surface of collar 102, is preferably made of stainless steel to withstand elevated temperatures, and includes a plurality of integral spacer sections 108 located on the upper surface thereof. Sections 108, preferably four in number, are adapted to permit air to circulate from holes 91 through the spaces between sections 108 to thereby promote cooling of nose assembly 89.

In operation, tester 82 is fitted upon thermocouple unit 80 whereby unit 80 is encased within bore 98, tester 82 being clamped in this position by virtue of the action of nose assembly 89. In a manner substantially identical to that of thermoswitch tester 21, a variable source of power is converted into heat by heating member 86, and the temperature of the upper region of conductor 87 is indicated on the potentiometer which is associated with tester 82. Further, the thermocouple of thermocouple unit 80 effects an indication of the temperature of this same upper region of conductor 87, such indication being made by the millivoltmeter located in the pilot's compartment. Thus, as will be apparent, inaccuracies or inoperability of thermocouple unit 80 will be readily revealed by a comparison of the two thermocouple readings.

Tester 82, like tester 21, is readily adapted for simultaneously testing a plurality of thermocouple units 80 by employing a plurality of testers 82 electrically connected in parallel, and, in addition, tester 82 is portable to thereby enable the testing of thermocouple units 80 located in various portions of the aircraft.

Figure 12:
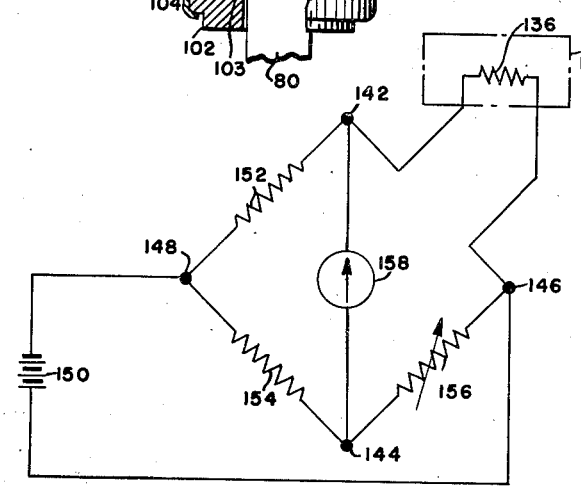
Figure 12 is a circuit for the embodiment of Figure 11.

As a further embodiment of the invention there is provided a structure as shown in Figure 11, for use in a circuit as shown in Figure 12. For extremely high temperatures whereat difficulty may be encountered in operation of the embedded thermocouple, it has been discovered that an element the resistance of which varies with temperature in a predetermined manner may be employed to sense the temperature of the tester.

Referring to Figure 11, structure is shown primarily in accordance with Figures 7–10, although the principles thereof also apply equally to the structure of Figures 1–6. The thermocouple or thermoswitch tester is here generally designated 120. This may be of a right angle configuration, although only the portion for receiving the device to be tested is shown. Utilizing the reference characters of Figures 7–10 insofar as applicable, section 85 of a tubular enclosure or housing is illustrated with cooling apertures 91, nose collar 102, nose spacer 104 and triangular-shaped spring lock 103. Screw 100 is illustrated for maintaining certain parts, to be described, in relation to the tubular housing 85. The device to be tested, for example, a thermocouple, is again designated by reference character 80 as in Figure 7. A heating winding 93 surrounds a heating member 122. Winding 93 will be connected by leads as in the embodiments previously described, to a source of variable power, all for raising the entire tester to a temperature to which the device 80 to be tested is to be subjected. Within the central bore 124 of heating member 122 is a heat conductor member 126. Heat conductor member 126 may be provided with a shoulder portion 128 at the lower end thereof, and a second shoulder portion 130 at the upper end thereof. Shoulder portions 128 and 130 are of such diameter as to snugly fit within the central bore 124 of the heating member 122. Between shoulder portions 128 and 130 there is a length 132 of reduced diameter. About this portion there may be wrapped a piece of insulating material 134, whereon may be wound an elongated conductor 136, which preferably is platinum, but may be any material the resistance of which varies in a known manner in relation to temperature. This conductor may be covered by or embedded in any suitable insulation to maintain the convolutions thereof electrically separated. A further layer of insulating material 138 may be wrapped about the wound resistance material. The complete assembly of heat conductor member 126 with the just-mentioned insulation and resistance member wound thereon, may be slidably inserted into the heating member 122 and the relationship maintained by set screw 100.

It will be understood that the structural features may vary from those as shown in Figure 11, without departing from the basic invention, which is to place a resistance element variable with temperature at such point as to sense the heat applied to the thermoswitch or thermocouple being tested.

The temperature-variable resistance 136 is diagrammatically illustrated in Figure 12 within the chain line 140, the latter being intended to represent the structure shown in Figure 11 and the equivalents thereof. Resistance element 136 is connected in a bridge circuit having terminals 142, 144, 146 and 148. A convenient source of power, such as battery 150, is connected across terminals 146 and 148. Resistor 152 is connected between terminals 142 and 148, and resistor 154 is connected between terminals 144 and 148. A variable resistor 156 is connected between terminals 144 and 146. Variable resistor 156 is to be a high quality calibrated resistor capable of fine adjustment.

A null point potential measuring instrument 158 is connected between terminals 142 and 144. It will now be apparent that instrument 158 will show a potential difference, of one polarity or another, depending upon whatever polarity difference may exist at any time between terminals 142 and 144 of the bridge circuit. Thus, assuming a given temperature for resistance element 136, adjustment of resistor 156 will bring the instrument 158 to a zero or null position. A scale (not shown) associated with resistance 156 may be directly calibrated in terms of degrees centigrade or degrees Fahrenheit, or whatever other standard is to be employed.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. A device for testing a heat sensing unit, said testing device comprising a heat conductive element formed to receive said heat sensing unit so that the element and unit will come into a predetermined bearing relationship, an electrical resistance wire surrounding said element for heating said element and consequently said sensing unit, a housing in which the heat conductive element and resistance wire are received, and temperature sensing means including a pair of conductors of dissimilar metal having a predetermined portion of said heat conductive element in direct and fixed electrical and thermal contact with the ends of the conductors.

2. A device as in claim 1 wherein the junction between the ends of the dissimilar conductors is staked into the heat conductive element.

3. A device as in claim 1 wherein a portion of the heat conductive element intervenes between the ends of dissimilar conductors.

4. A device as in claim 1 and further including a locking means in fixed position with respect to said heat conductive element for securing a heat sensing unit in said predetermined bearing relationship with said heat conductive element.

References Cited in the file of this patent

UNITED STATES PATENTS

| | | |
|---|---|---|
| 2,258,809 | Rabezzana | Oct. 14, 1941 |
| 2,317,168 | Ball | Apr. 20, 1943 |
| 2,535,083 | Martin | Dec. 26, 1950 |
| 2,570,781 | Duerr | Oct. 9, 1951 |
| 2,639,305 | Wills | May 19, 1953 |
| 2,647,237 | Herbst | July 28, 1953 |
| 2,658,380 | Evans | Nov. 10, 1953 |
| 2,758,469 | Clements et al. | Aug. 14, 1956 |

OTHER REFERENCES

Publication: "Jetcal Temperature System Tester," page 6, B. & H. Instrument Co., Inc., Fort Worth, Texas. Publication date about 1954.